United States Patent
Imamura et al.

(10) Patent No.: US 7,122,263 B2
(45) Date of Patent: Oct. 17, 2006

(54) FUEL CELL SYSTEM

(75) Inventors: Tomonori Imamura, Kariya (JP); Akimasa Osaki, Susono (JP)

(73) Assignee: Denso Corporation, Kariya (JP)

( * ) Notice: Subject to any disclaimer, the term of this patent is extended or adjusted under 35 U.S.C. 154(b) by 434 days.

(21) Appl. No.: 10/628,533

(22) Filed: Jul. 29, 2003

(65) Prior Publication Data
US 2004/0038098 A1    Feb. 26, 2004

(30) Foreign Application Priority Data
Jul. 29, 2002  (JP) ............................ 2002-219846
Jun. 10, 2003  (JP) ............................ 2003-165380

(51) Int. Cl.
*H01M 8/04*    (2006.01)
(52) U.S. Cl. .......................................... 429/25; 429/23
(58) Field of Classification Search ................ 429/22, 429/23, 25
See application file for complete search history.

(56) References Cited
U.S. PATENT DOCUMENTS
5,059,494 A * 10/1991 Vartanian et al. ......... 429/25 X
6,562,501 B1 * 5/2003 Nagamiya et al. ............ 429/25
2002/0142197 A1 * 10/2002 Kato et al. ................. 429/25 X
2002/0150802 A1 * 10/2002 Imamura et al. .......... 429/23 X
2002/0177017 A1 * 11/2002 Nelson et al. ................. 429/22

FOREIGN PATENT DOCUMENTS
| JP | A 8-306374 | 11/1996 |
|----|------------|---------|
| JP | A 9-320620 | 12/1997 |
| JP | A 11-191423 | 7/1999 |
| JP | A 2000-340241 | 12/2000 |

* cited by examiner

Primary Examiner—Stephen J. Kalafut
(74) Attorney, Agent, or Firm—Oliff & Berridge, PLC

(57) ABSTRACT

Provided is a fuel cell system capable of preventing a drop of power stemming from the water residence at an electrode portion or the shortage of water content in an electrolyte membrane. The system is equipped with an air pressure regulating valve for adjusting the pressure of air to be supplied to a fuel cell stack and a hydrogen pressure regulating valve for adjusting the pressure of hydrogen. In this system, the pressure difference between the air pressure and the hydrogen pressure is controlled through the regulating valves so that a minimum hydrogen pressure becomes higher than a maximum air pressure, or so that a minimum air pressure becomes higher than a maximum hydrogen pressure.

13 Claims, 10 Drawing Sheets

FUEL CELL SYSTEM

BACKGROUND OF THE INVENTION

1) Field of the Invention

The present invention relates to a fuel cell system comprising a fuel cell made to generate electric energy through electrochemical reactions between hydrogen and oxygen, and effectively applicable to generators for movable bodies such as vehicles and ships, portable generators, or home-service generators.

2) Description of the Related Art

In a fuel cell system comprising a fuel cell stack made to generate electric energy through electrochemical reactions between hydrogen and oxygen, lack of the water content of a solid electrolyte membrane or film causes a drop of the electric conductivity of the electrolyte to increase the resistance of the electrolyte, which leads to a decrease in cell power.

In addition, in a case in which excessive water exists on electrode portions of a fuel electrode or an air electrode, the inhibition of the electrochemical reaction at the electrode surfaces occurs to decrease the cell power.

In particular, in the case of the fuel cell system, for the purpose of enhancing the fuel utilization factor, in most cases, the hydrogen unused in a fuel cell is re-supplied, or the outlet side of a fuel passage is closed to prevent the emission of hydrogen. On the other hand, in the system operation, the outlet side of an air passage is generally placed into an open condition. Accordingly, water diffuses from the air electrode side through the electrolyte membrane to the fuel electrode side, and the diffused water tends to accumulate so that the water may exist excessively on the fuel electrode side.

Although the water accumulation or residence around the fuel electrode is preventable in a manner such that the fuel electrode or a valve, or the like, provided in the fuel passage is opened to purge the water therefrom and, hence, a drop of the power is avoidable, hydrogen is emitted into the atmosphere during the purging, which causes lowering the fuel efficiency and the safety.

From these points of view, there is a need to prevent the water residence at the electrode portions while properly maintaining the water content of the electrolyte membrane.

Meanwhile, Japanese Laid-Open No. HEI 11-191423 discloses a fuel cell system in which the water supply quantity to an oxidizer gas and a fuel gas is controlled in accordance with a property of a fuel cell to adjust the water content of an electrolyte membrane. There is a problem which arises with the system disclosed in the foregoing document, which is designed to merely control the water supply quantity to the oxidizer gas and the fuel gas, however, in that difficulty is encountered in preventing the water from becoming excessive at the electrode portions while maintaining a proper water content of the electrolyte membrane, or in that difficulty is experienced in humidifying the electrolyte membrane quickly.

SUMMARY OF THE INVENTION

The present invention has been developed with a view to eliminating the above-mentioned problems, and it is therefore an object of the invention to prevent a drop of the cell power stemming from the water residence around electrode portions or a shortage of water content of an electrolyte membrane and to achieve a quick ejection of the accumulated water from electrode portions and a prompt humidification of the electrolyte membrane.

For this purpose, in accordance with a first aspect of the present invention, there is provided a fuel cell system comprising a fuel cell stack (10) which generates electric power through an electrochemical reaction between an oxidizer gas containing oxygen as its principal component and a fuel gas containing hydrogen as its principal component, at least one of first pressure adjusting means (23) for adjusting a pressure of the oxidizer gas to be supplied to the fuel cell stack (10) and second pressure adjusting means (32) for adjusting a pressure of the fuel gas to be supplied to the fuel cell stack (10), and water state diagnosing means (40) for diagnosing a water state of the fuel cell stack (10), with a difference between the pressure of the oxidizer gas and the pressure of the fuel gas being controlled in accordance with a result of the diagnosis in the water state diagnosing means (40).

In addition, according to another aspect of the present invention, when the water in the fuel cell stack (10) is diagnosed as an excessive state, the diffusion from the air electrode side through the electrolyte membrane to the fuel electrode side is suppressible in a manner such that the difference in pressure between the fuel gas and the oxidizer gas is controlled so that the pressure of the fuel gas becomes higher than the pressure of the oxidizer gas, which can prevent the water residence at the electrode portions of the fuel electrode without purging the fuel electrode or a fuel passage. Still additionally, according to a further aspect of the present invention, if the internal water of the fuel cell stack (10) is diagnosed as shortage, the movement of water from the air electrode side to the fuel electrode side is promoted in a manner such that the pressure difference between the oxidizer gas and the fuel gas is controlled so that the pressure of the fuel gas becomes lower than the pressure of the oxidizer gas, thereby achieving the prompt humidification (increasing the water content) of the electrolyte membrane.

Accordingly, through the control of the pressure difference therebetween according to a result of diagnosis in the water state diagnosing means, it is possible to prevent a drop of the fuel cell power due to the water residence at the electrode portions or the shortage of the water content of the electrolyte membrane.

Moreover, according to a further aspect of the present invention, if the internal water of the fuel cell stack (10) is diagnosed as appropriateness, the pressure difference between the fuel gas and the oxidizer gas is reduced. This can maintain the internal water of the fuel cell stack in a proper state.

Still moreover, according to a further aspect of the present invention, the fuel cell system further comprises water quantity adjusting means (24) for controlling a water content of at least one of the oxidizer gas and the fuel gas so that the water content of at least one of the oxidizer gas and the fuel gas is decreased when a water permeation to the fuel gas is diagnosed as excess. This enables prompt water ejection.

Yet moreover, according to a further aspect of the present invention, the fuel cell system further comprises water quantity adjusting means (24) for controlling a water content of at least one of the oxidizer gas and the fuel gas so that the water content of at least of the oxidizer gas and the fuel gas is increased when the interior of the fuel cell stack (10) is diagnosed as a dry state. This enables prompt humidification of the electrolyte membrane.

Furthermore, according to a further aspect of the present invention, the pressure difference between the oxidizer gas and the fuel gas is controlled only for a given length of time in accordance with a result of the diagnosis.

Still furthermore, according to a further aspect of the present invention, when an integrated value of currents generated from the fuel cell stack (10) exceeds a predetermined value, the water state diagnosing means (40) makes a diagnosis that water in the fuel cell stack (10) is in an excessive state.

Yet furthermore, according to a further aspect of the present invention, the fuel cell stack (10) includes a lot of cells and the water state diagnosing means (40) makes a diagnosis on a water state of the fuel cell stack (10) on the basis of a dispersion state of generated voltages among the cells.

In addition, according to a further aspect of the present invention, the water state diagnosing means (40) includes water quantity measuring means (51, 52) provided in at least one of an oxidizer gas outlet/inlet portion of the fuel cell stack (10) and a fuel gas outlet/inlet portion thereof for measuring a water quantity of the gas. This can diagnose a water state of the fuel cell stack.

Still additionally, according to a further aspect of the present invention, the water state diagnosing means (40) includes resistance measuring means (60) for measuring a resistance of the electrolyte membrane of the fuel cell stack (10). Likewise, this can diagnose a water state of the fuel cell stack.

Yet additionally, according to a further aspect of the present invention, the fuel cell system further comprises oxidizer gas inlet pressure measuring means (71) for measuring an inlet pressure of the oxidizer gas in the interior of the fuel cell stack (10) and fuel gas outlet pressure measuring means (82) for measuring an outlet pressure of the fuel gas in the interior of the fuel cell stack (10), with the pressure of the oxidizer gas and the pressure of the fuel gas being controlled in accordance with results of the measurement in the oxidizer gas inlet pressure measuring means (71) and the fuel gas outlet pressure measuring means (82).

This enables the control to be easily and certainly implemented in all the internal regions of the fuel cell stack so that the pressure of the fuel gas becomes higher than the pressure of the oxidizer gas. Additionally, since the diffusion of water from the air electrode side through the electrolyte membrane to the fuel electrode side is suppressible through the use of this pressure control, it is possible to prevent the water residence at the electrode portions of the fuel electrode without purging the fuel electrode or the fuel passage.

Moreover, according to a further aspect of the present invention, the fuel cell system further comprises oxidizer gas inlet pressure measuring means (71) for measuring an inlet pressure of the oxidizer gas in the interior of the fuel cell stack (10), oxidizer gas outlet pressure measuring means (72) for measuring an outlet pressure of the oxidizer gas in the interior of the fuel cell stack (10), fuel gas inlet pressure measuring means (81) for measuring an inlet pressure of the fuel gas in the interior of the fuel cell stack (10), and fuel gas outlet pressure measuring means (82) for measuring an outlet pressure of the fuel gas in the interior of the fuel cell stack (10), with the pressure of the oxidizer gas and the pressure of the fuel gas being controlled on the basis of the outlet pressure of one of the oxidizer gas and the fuel gas which is controlled to be higher than the other and the inlet pressure of one of the oxidizer gas and the fuel gas which is controlled to be lower than the other.

This can easily and surely accomplish the control whereby the pressure of the fuel gas becomes higher than the pressure of the oxidizer gas in all internal regions of the fuel cell stack or the control whereby the pressure of the oxidizer gas becomes higher than the pressure of the fuel gas in all the internal regions of the fuel cell stack. In addition, since the water diffusion from the air electrode side through the electrolyte membrane to the fuel electrode side is suppressible through the use of the former pressure control, it is possible to prevent the water residence at the electrode portions of the fuel electrode without purging the fuel electrode or the fuel passage. Still additionally, since the water movement from the air electrode side to the fuel electrode side can be promoted through the use of the latter pressure control, it is possible to carry out prompt humidification of the electrolyte membrane.

The reference numerals in parentheses attached to the respective means or members signify the corresponding relation with respect to the concrete means in an embodiment which will be described later.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS (First Embodiment)

Figure 1:
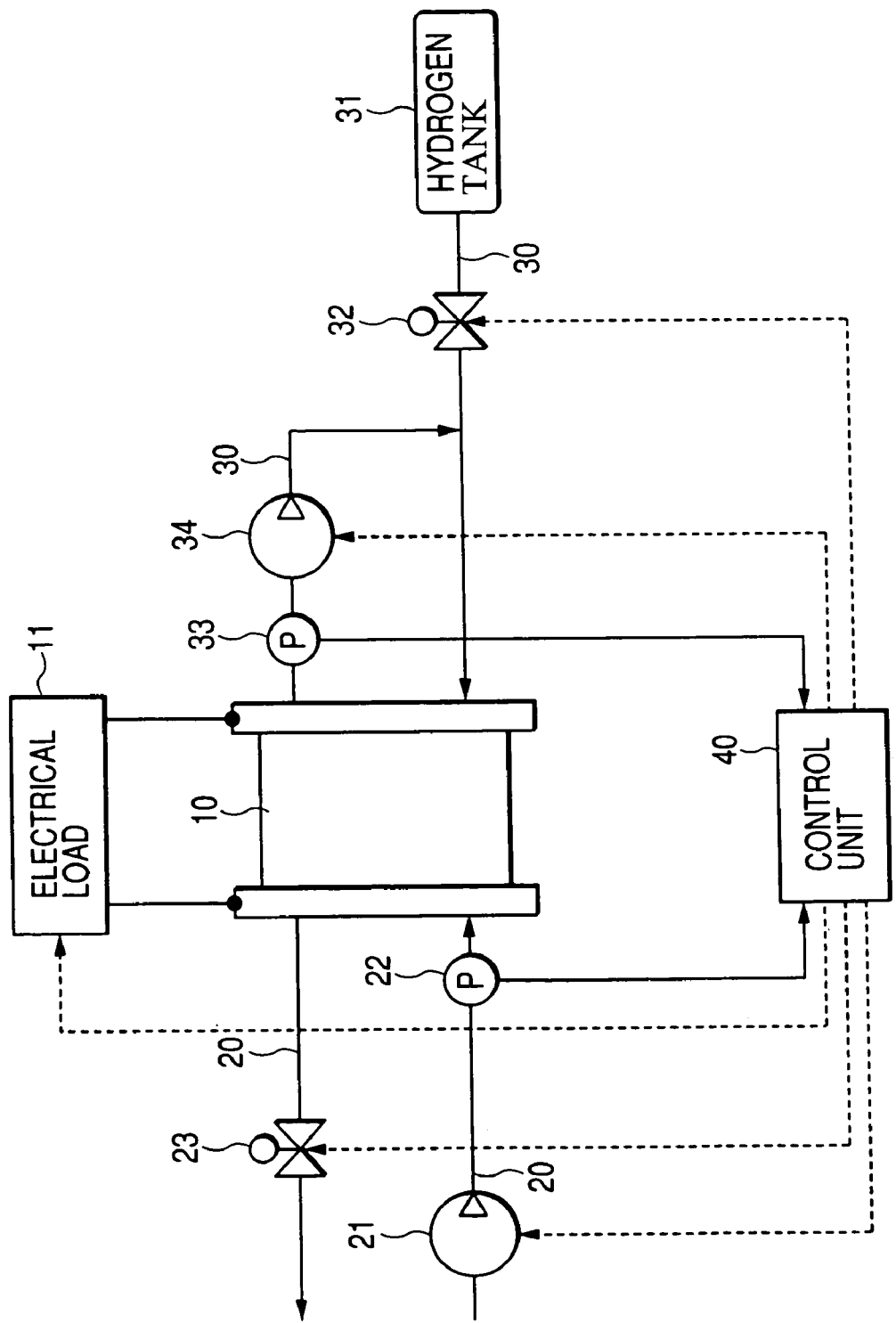
FIG. 1 is a schematic illustration of the entire configuration of a fuel cell system according to a first embodiment of the present invention.

FIG. 1 illustratively shows a fuel cell system according to a first embodiment of the present invention and, for example, this fuel cell system is applicable to electric vehicles (fuel cell powered vehicle) using a fuel cell as an electric power source.

As FIG. 1 shows, the fuel cell according to this embodiment is equipped with a fuel cell stack 10 designed to generate electric power through the use of electrochemical reaction between hydrogen and oxygen. This fuel cell stack 10 is for supplying electric power to electric equipment such as an electrical load 11 or a secondary battery (not shown). In the case of an electric vehicle, its vehicle driving electric motor corresponds to the electrical load 11.

In the first embodiment, a solid polyelectrolyte type fuel cell stack is employed as the fuel cell stack 10, and a plurality of fuel cells each constitutes basic unit are formed into a stacked condition and are electrically connected in series to each other. In the fuel cell stack 10, upon receipt of the supply of hydrogen and oxygen, the following electrochemical reaction between hydrogen and oxygen takes place to generate electric energy.

(negative electrode side) 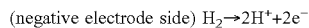$H_2 \rightarrow 2H^+ + 2e^-$ (positive electrode side) 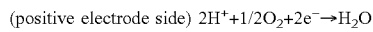$2H^+ + 1/2O_2 + 2e^- \rightarrow H_2O$ The fuel cell system includes an air passage 20 for supplying air (oxygen) to an air electrode (positive electrode) side of the fuel cell stack 10 and a fuel passage 30 for supplying hydrogen to a fuel electrode (negative electrode) side of the fuel cell stack 10. In this case, the air corresponds to an oxidizer gas in the present invention while hydrogen corresponds to a fuel gas therein.

An air pump 21 is provided at the most upstream portion of the air passage 20 to supply air, sucked from the atmosphere, to the fuel cell stack 10 under pressure, and an air pressure sensor 22 is provided between the air pump 21 in the air passage 20 and the fuel cell stack 10 to measure an air pressure at a portion through which the air flows into the fuel cell stack 10. Moreover, an air pressure regulating valve 23 is provided in the air passage 20 on the downstream side of the fuel cell stack 10 to adjust the pressure of air to be supplied to the fuel cell stack 10. In this case, the air pressure sensor 22 located at the above-mentioned position measures a maximum air pressure in the interior of the fuel cell stack 10.

The air pump 21 is of a type that its speed of rotation is electrically variable, and the air pressure regulating valve 23 is of a type that a value to which the air pressure is to be regulated is electrically variable. The air pressure sensor 22 corresponding to the first pressure measuring means in the present invention while the air pressure regulating valve 23 corresponds to the first pressure adjusting means therein.

A hydrogen tank 31 filled with hydrogen is placed at the most upstream portion of the fuel passage 30, and a hydrogen pressure regulating valve 32 is placed in the fuel passage 30 between the hydrogen tank 31 and the fuel cell stack 10 to adjust the pressure of hydrogen to be supplied to the fuel cell stack 10.

The downstream side of the fuel cell stack 10 is connected to the downstream side of the hydrogen pressure regulating valve 32 so that the fuel passage 30 is formed into a closed loop configuration, thereby circulating hydrogen in the fuel passage 30 to re-supply the unused hydrogen in the fuel cell stack 10 to the fuel cell stack 10.

In addition, in the fuel passage 30 on the downstream side of the fuel cell stack 10, there are located a hydrogen pressure sensor 33 for measuring a pressure of hydrogen at a portion through which hydrogen flows from the fuel cell stack 10 and a hydrogen pump 34 for circulating hydrogen in the fuel passage 30. In this case, the hydrogen pressure sensor 33 located at the above-mentioned position measures a minimum hydrogen pressure in the interior of the fuel cell stack 10.

The hydrogen pump 34 is of a type that its speed of rotation is electrically changeable and the hydrogen pressure regulating valve 32 is of a type that a value to which the hydrogen pressure is to be regulated is electrically changeable. The hydrogen pressure sensor 33 corresponds to the second pressure measuring means in the present invention, while the hydrogen pressure regulating valve 32 corresponds to the second pressure adjusting means therein. The air pressure regulating valve 23 and the hydrogen pressure regulating valve 32 constitute the pressure adjusting means in the present invention.

A control unit (ECU) 40 is composed of a well-known microcomputer comprising a CPU, a ROM, a RAM and others and its peripheral circuits. A desired power forming a target value of electric power to be generated in the fuel cell stack 10 is calculated in another ECU (not shown), and the control unit 40 receives a desired power signal from the another ECU, an air pressure signal from the air pressure sensor 22 and a hydrogen pressure signal from the hydrogen pressure sensor 33. Moreover, the control unit 40 outputs control signals to the air pump 21, the air pressure regulating valve 23, the hydrogen pressure regulating valve 32 and the hydrogen pump 34.

Figure 2:
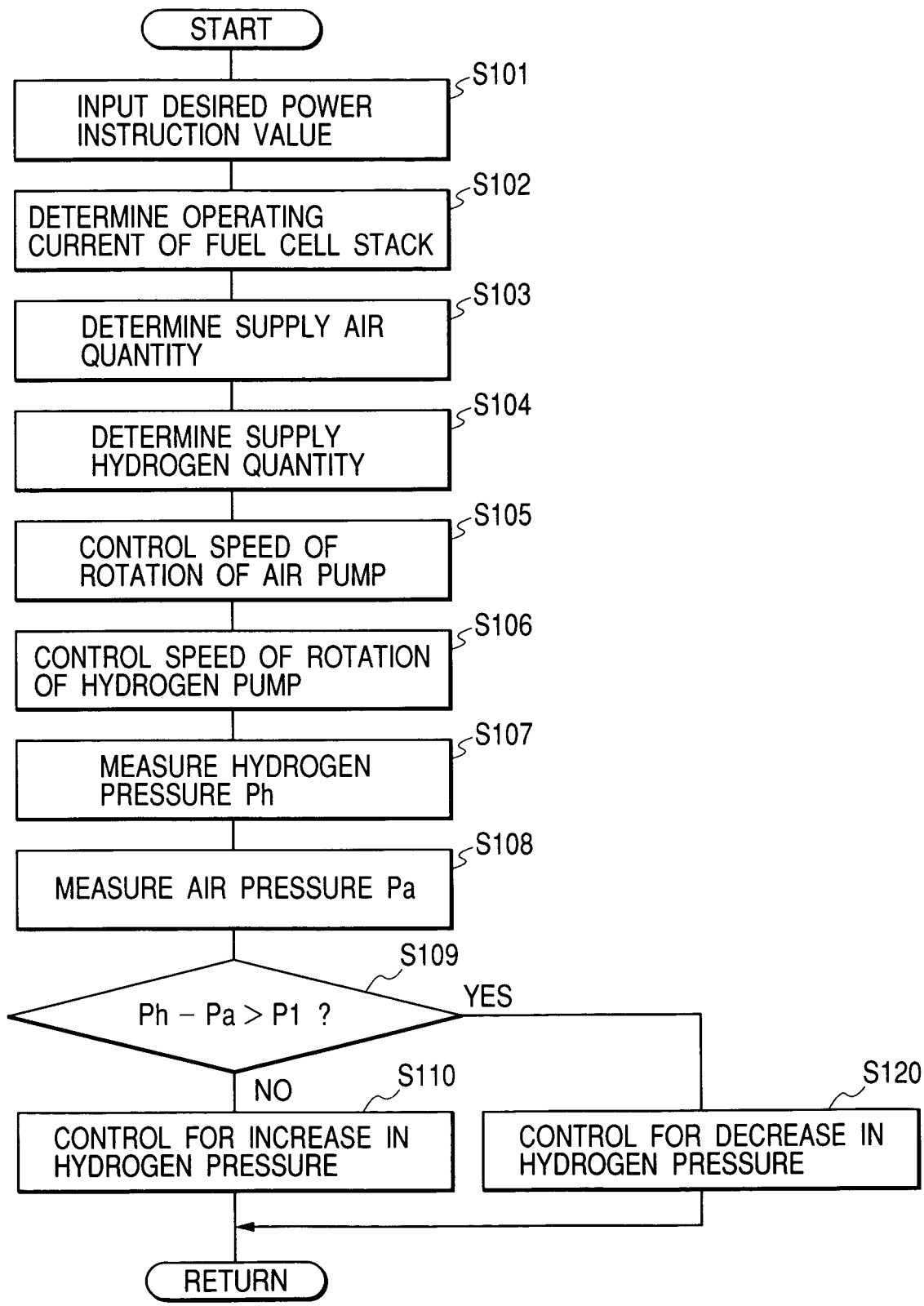
FIG. 2 is a flow chart showing control processing to be implemented in a control unit shown in FIG. 1.

Referring to FIGS. 1 and 2, a description will be given hereinbelow of an operation of the fuel cell system thus constructed. FIG. 2 is a flow chart showing the control processing to be executed in the control unit 40.

First of all, an instruction value indicative of a desired power, calculated in the another ECU, is inputted in a step S101, then followed by a step S102 to determine a desired operating current value for the fuel cell stack 10 on the basis of the instruction value inputted in the step S101 in accordance with a map stored in advance in the ROM.

Subsequently, a step S103 is implemented to determine a quantity of air to be supplied to the fuel cell stack 10 according to the map previously stored in the ROM on the basis of the desired value determined in the step S102, then followed by a step S104 to determine a quantity of hydrogen to be supplied to the fuel cell stack 10 according to the map previously stored in the ROM on the basis of the desired value determined in the step S102.

In a step S105, the speed of rotation of the air pump 21 is controlled to provide the air supply quantity determined in the step S103, then followed by a step S106 to control the speed of rotation of the hydrogen pump 34 to provide the hydrogen supply quantity determined in the step S104.

Moreover, upon receipt of a hydrogen pressure signal from the hydrogen pressure sensor 33, a step S107 is implemented to measure a hydrogen pressure Ph at an outlet portion of the fuel cell stack 10, then followed by a step S108 to, upon receipt of an air pressure signal from the air pressure sensor 22, measure an air pressure Pa at an inlet portion of the fuel cell stack 10.

Following this, in a step S109, a pressure difference ΔP (ΔP=Ph-Pa) between the outlet portion hydrogen pressure Ph and the inlet portion air pressure Pa is compared with a set value P1 which is a positive value. If the pressure difference ΔP is below the set value P1 that is, if the decision in the step S109 indicates "NO", the operational flow advances to a step S110 to execute the control for increasing the outlet portion hydrogen pressure Ph through the use of the hydrogen pressure regulating valve 32.

On the other hand, if the pressure difference ΔP (ΔP=Ph-Pa) is larger than the set value P1 that is, if the decision in the step S109 indicates "YES", the operational flow proceeds to a step S120 to execute the control for decreasing the outlet portion hydrogen pressure Ph through the use of the hydrogen pressure regulating valve 32.

Thus, the outlet portion hydrogen pressure Ph is controlled to always become a pressure higher by the set value P1 or more than the inlet portion air pressure Pa. In other words, under the control, a minimum hydrogen pressure in the interior of the fuel cell stack 10 is always set at a pressure higher by the set value or more than a maximum air pressure in the interior of the fuel cell stack 10. That is, the hydrogen pressure becomes higher than the air pressure in all internal regions of the fuel cell stack 10.

In addition, since this pressure control limits the water diffusion from the air electrode side through the electrolyte membrane to the fuel electrode side, it is possible to prevent the water residence around the electrode portions of the fuel electrode without purging the fuel electrode or the fuel passage 30.

In this connection, although in this embodiment the outlet portion hydrogen pressure Ph is adjusted through the use of the hydrogen pressure regulating valve 32 in the steps S110 and S120, it is also appropriate that the inlet portion air pressure Pa is adjusted through the use of the air pressure regulating valve 23. In this case, the control in the step S110 is executed to lower the inlet portion air pressure Pa while the control in the step S120 is implemented to raise the inlet portion air pressure Pa.

Moreover, it is also appropriate that both the outlet portion hydrogen pressure Ph and the inlet portion air pressure Pa are adjusted in the steps S110 and S120. In this case, the step S110 is implemented to increase the outlet portion hydrogen pressure Ph and decrease the inlet portion air pressure Pa, while the step S120 is executed to decrease the outlet portion hydrogen pressure Ph and increase the inlet portion air pressure Pa.

Still moreover, although in this embodiment the outlet portion hydrogen pressure Ph is adjusted through the use of the hydrogen pressure regulating valve 32 on the basis of a result of the comparison between the pressure difference ΔP and the set value P1 it is also possible that the operations of the air pressure regulating valve 23 and the hydrogen pressure regulating valve 32 are controlled according to a map stored in advance in the ROM as will be mentioned below.

That is, the relationship between a minimum hydrogen pressure and maximum air pressure in the interior of the fuel cell stack 10 is examined in advance through experiments in a state where the air supply quantity and the hydrogen supply quantity, which are determined on the basis of a desired value of the operating current, and the opening degrees of the air pressure regulating valve 23 and the hydrogen pressure regulating valve 32 are used as parameters, and the opening degrees of the air pressure regulating valve 23 and the hydrogen pressure regulating valve 32 are determined so that the minimum hydrogen pressure in the interior of the fuel cell stack 10 becomes higher than the maximum air pressure in the interior of the fuel cell stack 10 at all times.

Yet moreover, the determined opening degrees of the air pressure regulating valve 23 and the hydrogen pressure regulating valve 32 are associated with a desired operating current value to form a map and the formed map is stored in the ROM. Thus, the operations of the air pressure regulating valve 23 and the hydrogen pressure regulating valve 32 are controlled in accordance with the map. This can eliminate the need for the employment of the air pressure sensor 22 and the hydrogen pressure sensor 33.

(Second Embodiment)

Furthermore, referring to FIGS. 3 and 4, a description will be given hereinbelow of a second embodiment of the present invention. In this embodiment, an inlet portion air pressure Pa, an outlet portion hydrogen pressure Ph and an air humidification quantity are controlled in accordance with a result of the diagnosis of an operating state of the fuel cell stack 10. The parts identical or corresponding to those in the above-described first embodiment will be marked with the same reference numerals, and the description thereof will be omitted for brevity.

Figure 3:
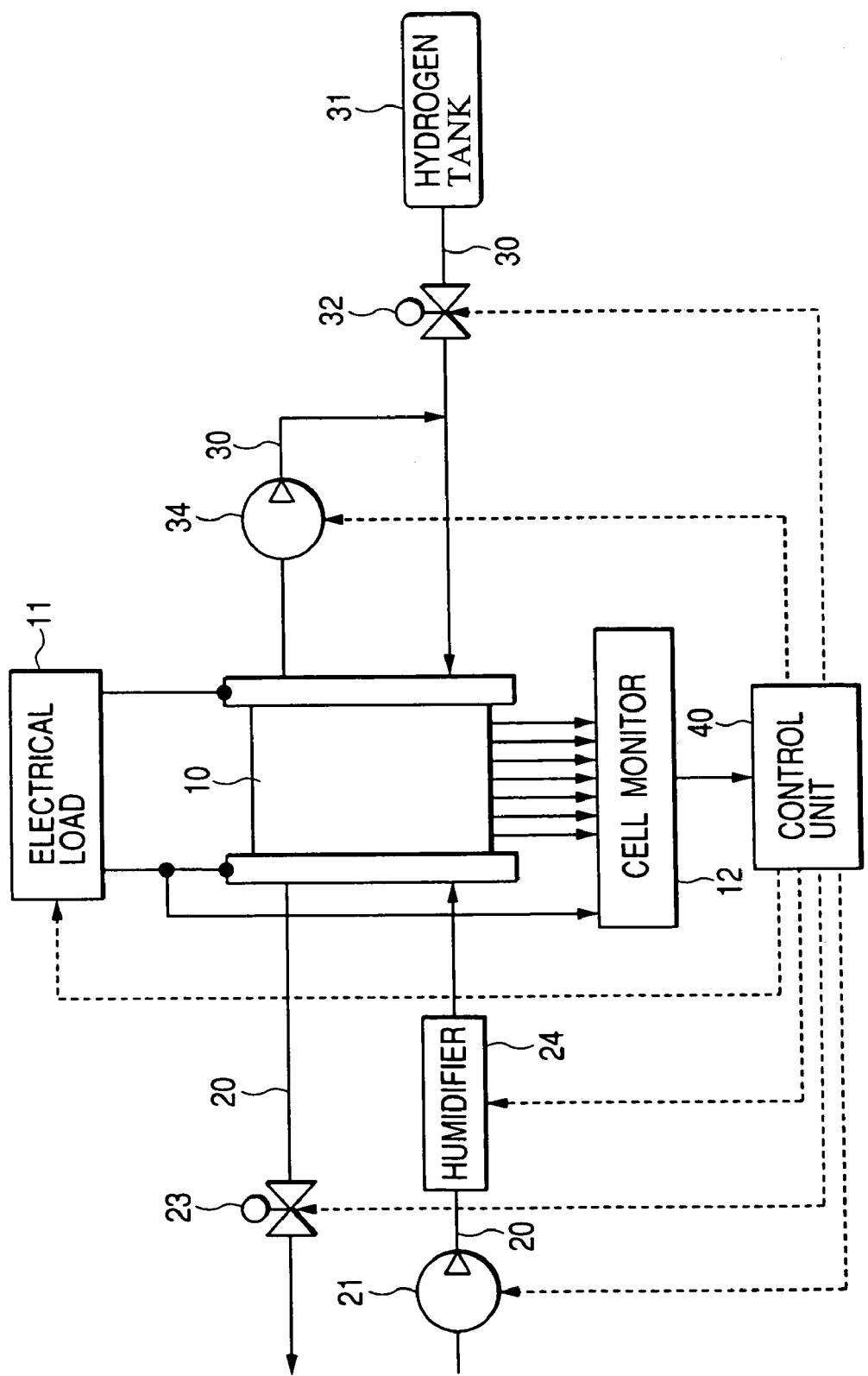
FIG. 3 is a schematic illustration of the entire configuration of a fuel cell system according to a second embodiment of the present invention.

FIG. 3 is an illustration of the entire configuration of a fuel cell system according to this embodiment. As FIG. 3 shows, a humidifier 24, made to humidify air, is placed between the air pump 21 connected to the air passage 20 and the fuel cell stack 10, and in conjunction with the fuel cell stack 10, a cell monitor 12 is provided to detect an output voltage of each of the cells constituting the fuel cell stack 10, with a cell voltage signal corresponding to the cell output voltage detected by the cell monitor 12 being inputted to the control unit 40. The humidifier 24 corresponds to the water quantity adjusting means in the present invention.

The control unit 40 is made to diagnose a water residence state or an electrolyte membrane dry state on the fuel electrode side of the fuel cell stack 10, that is, an operating state of the fuel cell stack 10, on the basis of an output voltage of each of the cells. Therefore, the control unit 40 and the cell monitor 12 correspond to the water state diagnosing means in the present invention.

In this connection, unlike the above-described first embodiment, this embodiment is not equipped with an air pressure sensor 22 and a hydrogen pressure sensor 33. For this reason, a map in which an opening degree of the air pressure regulating valve 23 and an inlet portion air pressure Pa are associated with (related to) each other and a map in which an opening degree of the hydrogen pressure regulating valve 32 and an outlet portion hydrogen pressure Ph are associated with each other are stored in the ROM. Thus, an inlet portion air pressure Pa and an outlet portion hydrogen pressure Ph are obtained through the use of these maps.

Secondly, referring to FIGS. 3 and 4, a description will be given hereinbelow of an operation of the fuel cell system thus constructed. FIG. 4 is a flow chart showing control processing to be implemented in the control unit 40.

First of all, an instruction value indicative of a desired power is inputted in a step S101, then followed by a step S102 to determine a desired operating current value for the fuel cell stack 10 in accordance with a map on the basis of the instruction value inputted in the step S101.

Subsequently, a step S103 is implemented to determine a quantity of air to be supplied to the fuel cell stack 10 according to the map on the basis of the desired value determined in the step S102, then followed by a step S103a to determine a basic pressure of the supply air in accordance with the map on the basis of the desired value determined in the step S102.

Subsequently, a step S104 is implemented to determine a quantity of hydrogen to be supplied to the fuel cell stack 10 according to the map on the basis of the desired value determined in the step S102, then followed by a step S104a to determine a basic pressure of the supply hydrogen according to the map on the basis of the desired value determined in the step S102.

In a step S105a, a basic opening degree of the air pressure regulating valve 23 is determined so that the air pressure determined in the step S103a is achievable. In a step S105, the speed of rotation of the air pump 21 is controlled to provide the air supply quantity determined in the step S103.

In a step S106, the speed of rotation of the hydrogen pump 34 to provide the hydrogen supply quantity determined in the step S104. In a step S106a, a basic opening degree of the hydrogen pressure regulating valve 32 is determined to realize the hydrogen pressure determined in the step S104*a*.

In a step S130, a basic air humidification quantity is determined on the basis of the desired operating current value determined in the step S102.

Following this, a step S140 is implemented to diagnose a water residence state and/or an electrolyte membrane dry state on the fuel electrode side in the fuel cell stack 10, i.e., an operating state of the fuel cell stack 10.

Concretely, an average cell voltage, voltage deviations of the cells and a standard deviation of cell voltages are first calculated on the basis of the output voltages of the cells. Then, in a situation in which water resides on the fuel electrode side of a specific cell, since it is expected that the humidification of hydrogen or air reaches a sufficient condition, the cells other than the specific cell are in a normal operating condition so that the average cell voltage does not drop largely, and only the voltage generated from the specific cell drops considerably. Therefore, in a case in which the average cell voltage is in a normal range but there is a cell showing an extremely, or abnormally, large deviation, it is estimated that there is a cell in which water exists on its fuel electrode side.

In addition, in a case in which the electrolyte membrane is in a dry condition, it is estimated that dry air is supplied to the air electrode. Therefore, in all the cells, the electrolyte membranes tend to be dried so that the average cell voltage drops largely. On the other hand, in the case of the dry air being supplied, the condensate (water) is hard to generate and, hence, water does not stay easily on the fuel electrode side, which does not produce a cell whose voltage generated drops largely. Therefore, in a case in which the average drops largely and each of the cells shows a small deviation, it can be considered that the electrode membranes are in a dried condition.

Thereafter, in a step S150, a decision is made, on the basis of the diagnosis result in the step S140, as to whether the water in the interior of the fuel cell stack 10 is excessive or not, more concretely, whether or not there is a cell in which water stays on the fuel electrode side. If it is estimated that there is a cell in which water stays on the fuel electrode side, that is, when the answer of the step S150 indicates "YES", the operational flow advances to a step S151.

In the step S151, the hydrogen pressure regulating valve 32 is controlled to increase the outlet portion hydrogen pressure Ph so that a pressure difference $\Delta P$ ($\Delta P = Ph - Pa$) between the outlet portion hydrogen pressure Ph and the inlet portion air pressure Pa exceeds a first set value P1 which is a positive value. Thus, when the outlet portion hydrogen pressure Ph is increased to be higher than the inlet portion air pressure Pa, it is possible to promote the effect of the water on the fuel electrode side being ejected through the electrolyte membrane to the air electrode side.

Following this, the operational flow proceeds to a step S152 to adjust the humidification quantity of air through the use of the humidifier 24. When the air humidification quantity is adjusted in this way, it is possible to suppress the diffusion of water from the air electrode side through the electrolyte membrane to the fuel electrode side. Moreover, through the implementation of the control in the steps S151 and S152, it is possible to eject the water on the fuel electrode side quickly.

On the other hand, if the decision in the step S150 indicates "NO", the operational flow advances to a step S160 to make a decision, on the basis of the diagnosis result in the step S140, as to whether the water in the interior of the fuel cell stack 10 is insufficient or not, more concretely, whether or not the electrolyte membrane falls into a dry condition. If it is considered that the electrolyte membrane is in the dry condition, that is, the step S160 indicates "YES", the operational flow goes to a step S161.

In a step S161, the hydrogen pressure regulating valve 32 is controlled to lower the outlet portion hydrogen pressure Ph so that the pressure difference between the outlet portion hydrogen pressure Ph and the inlet portion air pressure Pa falls below a second set value P2 which is a negative value. When the outlet portion hydrogen pressure Ph is decreased to be lower than the inlet portion air pressure Pa in this way, it is possible to promote the movement of water from the air electrode side through the electrolyte membrane to the fuel electrode side, thereby accomplishing the humidification of the electrolyte membrane quickly.

Subsequently, a step S162 follows to increase the humidification quantity of air through the use of the humidifier 24. When the air humidification quantity is increased in this way, the humidification of the electrolyte membrane from the air electrode side is promptly achievable.

Furthermore, in a case in which the interior of the fuel cell stack 10 has an appropriate water quantity, more concretely, if water does not stay on the fuel electrode side and the electrolyte membrane is not dried yet, both the decisions in the steps S150 and S160 indicate "NO" and the operational flow goes to a step S170.

In the step S170, the outlet portion hydrogen pressure Ph is controlled through the use of the hydrogen pressure regulating valve 32 so that the pressure difference between the outlet portion hydrogen pressure Ph and the inlet portion air pressure Pa is decreased, more concretely, the absolute value of the pressure difference between the outlet portion hydrogen pressure Ph and the inlet portion air pressure Pa falls below a third set value P3 which is a positive value. In this connection, the third set value P3 is set to be lower than the first set value P1 and to be lower than the absolute value of the second set value P2. Then, the operational flow advances to a step S171 to control the quantity of air humidification to be carried out using the humidifier 24, to the basic humidification quantity determined in the step S130. Through the implementation of the control in the steps S170 and S171, the water in the interior of the fuel cell stack 10 is maintainable in an appropriate state.

Incidentally, although in this embodiment, of air and hydrogen, only the air is humidified, it is also appropriate to humidify the hydrogen. In the case of the hydrogen humidification, the hydrogen humidification quantity is decreased in the step S152 and is increased in the step S162.

Moreover, although in this embodiment the outlet portion hydrogen pressure Ph is controlled through the hydrogen pressure regulating valve 32 to increase in a case in which it is considered that there exists a cell(s) in which water stays on the fuel electrode side, it is also appropriate that the inlet portion air pressure Pa is controlled through the use of the air pressure regulating valve 23 to decrease so that the outlet portion hydrogen pressure Ph rises relatively with respect to the inlet portion air pressure Pa.

Still moreover, although in this embodiment the outlet portion hydrogen pressure Ph is controlled to be lowered through the use of the hydrogen pressure regulating valve 32 in a case in which it is estimated that the electrolyte membrane is in a dry state, it is also appropriate that the inlet portion air pressure Pa is controlled to be increased through the use of the air pressure regulating valve 23 so that the outlet portion hydrogen pressure Ph drops relatively with respect to the inlet portion air pressure Pa.

Yet moreover, although in this embodiment the control of the pressure difference between the outlet portion hydrogen pressure Ph and the inlet portion air pressure Pa and the control of the humidification quantity are executed on the basis of the decision results in the steps S150 and S160, it is also acceptable that only the pressure difference control is implemented without executing the humidification quantity control in the steps S152, S162 and S171.

(Third Embodiment)

Figure 4:
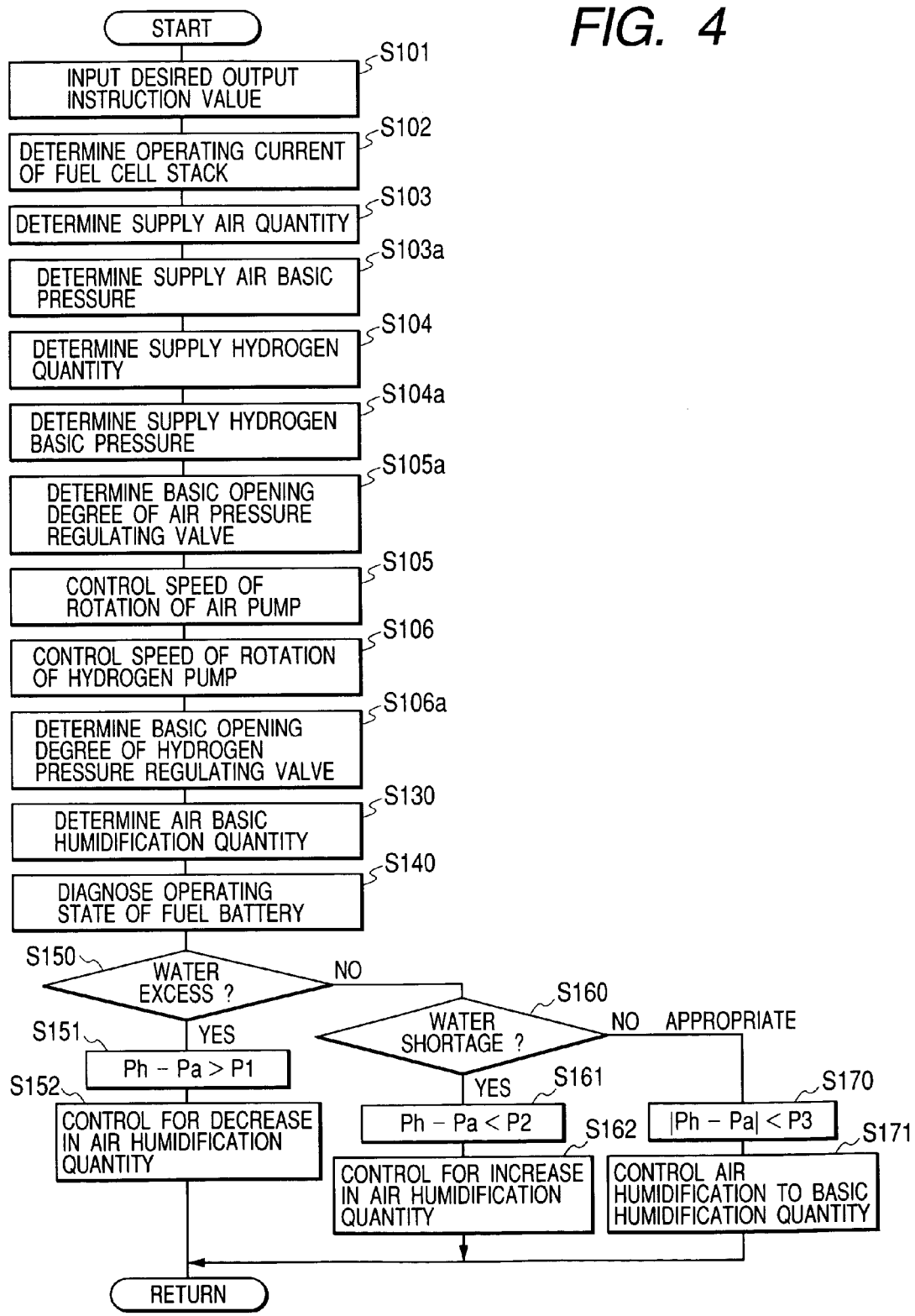
FIG. 4 is a flow chart showing control processing to be implemented in a control unit shown in FIG. 3.
Figure 5:
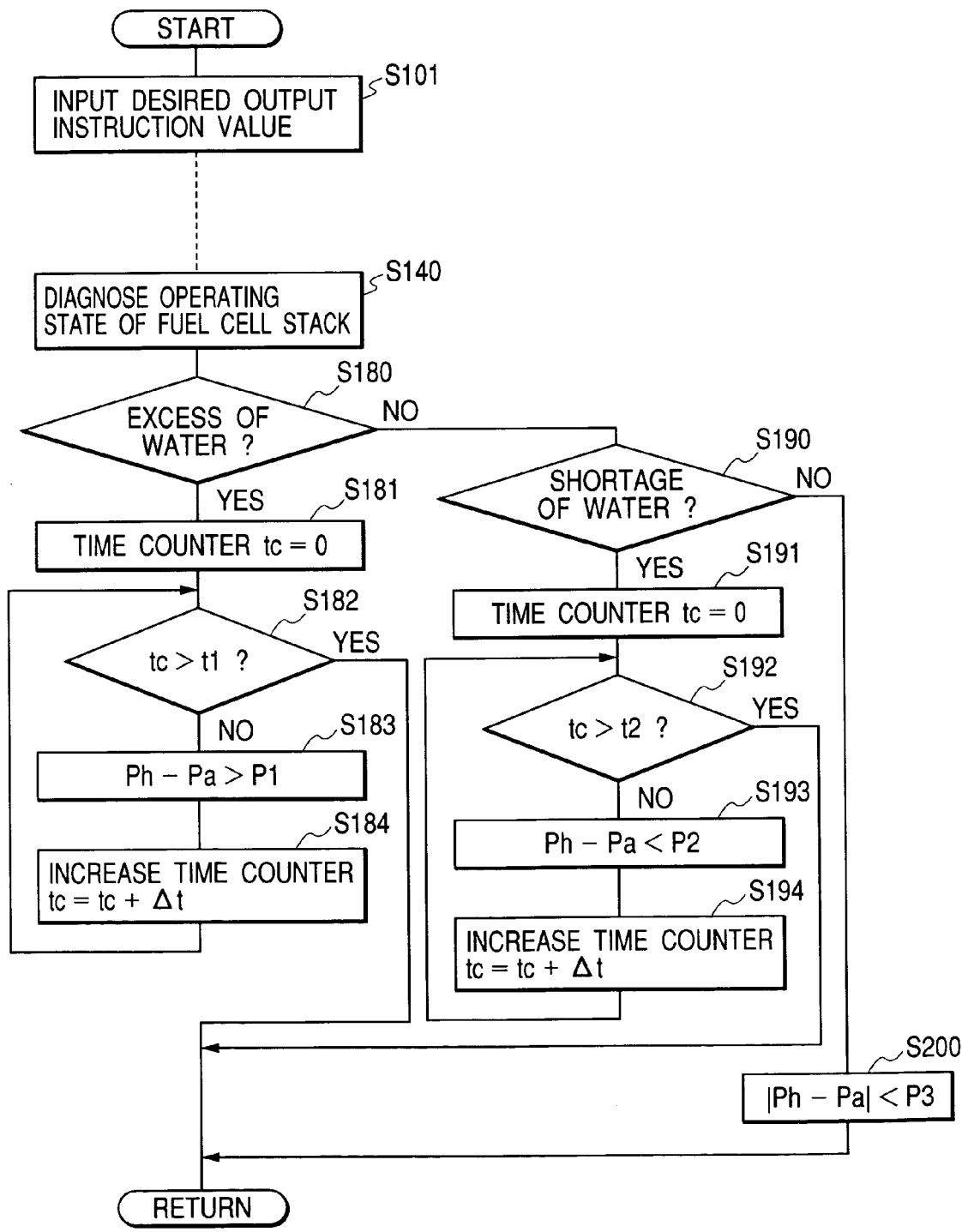
FIG. 5 is a flow chart showing control processing to be implemented in a fuel cell system according to a third embodiment of the present invention.

Referring to FIG. 5, a description will be given hereinbelow of a third embodiment of the present invention. This embodiment is made to control the pressure difference between the outlet portion hydrogen pressure Ph and the inlet portion air pressure Pa only for a fixed period of time in accordance with a result of diagnosis on an operating state of the fuel cell stack 10. The entire configuration of the fuel cell system according to this embodiment is the same as that of the above-described second embodiment. FIG. 5 is a flow chart showing control processing to be implemented in the control unit 40, and the steps S102 to S130 (see FIG. 4) described in the second embodiment are omitted in FIG. 5.

In FIG. 5, in a step S180, a decision is made, on the basis of the diagnosis result in the step S140, as to whether the water in the interior of the fuel cell stack 10 is superfluous or not, more concretely, whether or not there is a cell(s) in which water stays on the fuel electrode side. If it is estimated that there exists a cell in which water stays on the fuel electrode side, the pressure difference control in a step S183, which will be described later, is implemented only for a constant period of time.

That is, in the step S181, a time counter is reset so that the time tc becomes at zero, and a step S182 is implemented to make a decision as to whether or not the time tc exceeds a first set time t1. If it does not exceed the first set time t1, after the implementation of a step S183, in a step S184, the time tc is updated to become a value obtained by adding a fixed time Δt thereto. After the updating, if the updated time tc exceeds the first set time t1, the step S182 turns to "YES", and the pressure difference control in the step S183 reaches completion.

In the step S183, the hydrogen pressure regulating valve 32 is controlled to increase the outlet portion hydrogen pressure Ph so that a pressure difference ΔP (ΔP=Ph−Pa) between the outlet portion hydrogen pressure Ph and the inlet portion air pressure Pa exceeds a first set value P1 which is a positive value. Thus, when the outlet portion hydrogen pressure Ph is increased to be higher than the inlet portion air pressure Pa, it is possible to promote the effect of the water on the fuel electrode side being ejected through the electrolyte membrane to the air electrode side.

On the other hand, if the decision of the step S180 indicates "NO", the operational flow proceeds to a step S190. In the step S190, a decision is made, on the basis of the diagnosis result in the step S140, as to whether the water in the interior of the fuel cell stack 10 is insufficient, more concretely, whether or not the electrolyte membrane is in a dried condition. If the electrolyte membrane is dried, the pressure difference control in a step S193, which will be described later, is implemented only for a fixed period of time.

That is, in the step S191, the time counter is reset so that the time tc becomes at zero, and in a step S192, a decision is made as to whether or not the time tc exceeds a second set time t2. If it does not exceed the second set time t2, after the implementation of the control in the step S193, in a step S194, the time tc is updated to become a value obtained by adding a fixed time Δt thereto. After the updating, if the updated time tc exceeds the second set time t2 the step S192 turns to "YES", the pressure difference control in the step S193 reaches completion.

In the step S193, the hydrogen pressure regulating valve 32 is controlled to decrease the outlet portion hydrogen pressure Ph so that the pressure difference between the outlet portion hydrogen pressure Ph and the inlet portion air pressure Pa falls below a second set value P2 which is a negative value. Thus, when the outlet portion hydrogen pressure Ph is decreased to be lower than the inlet portion air pressure Pa, it is possible to promote the effect of the water being moved from the air electrode side through the electrolyte membrane to the fuel electrode side, thereby achieving the humidification of the electrolyte membrane promptly.

On the other hand, if the interior of the fuel cell stack 10 has an appropriate water quantity, more concretely, if water does not stay on the fuel electrode side and the electrolyte membrane is not dried yet, both the decisions in the steps S180 and S190 indicate "NO" and the operational flow goes to a step S200.

In the step S200, the outlet portion hydrogen pressure Ph is controlled through the use of the hydrogen pressure regulating valve 32 so that the pressure difference between the outlet portion hydrogen pressure Ph and the inlet portion air pressure Pa is decreased, more concretely, the absolute value of the pressure difference between the outlet portion hydrogen pressure Ph and the inlet portion air pressure Pa falls below a third set value P3 which is a positive value. In this case, the third set value P3 is set to be lower than the first set value P1 and to be lower than the absolute value of the second set value P2.

(Fourth Embodiment)

Figure 6:
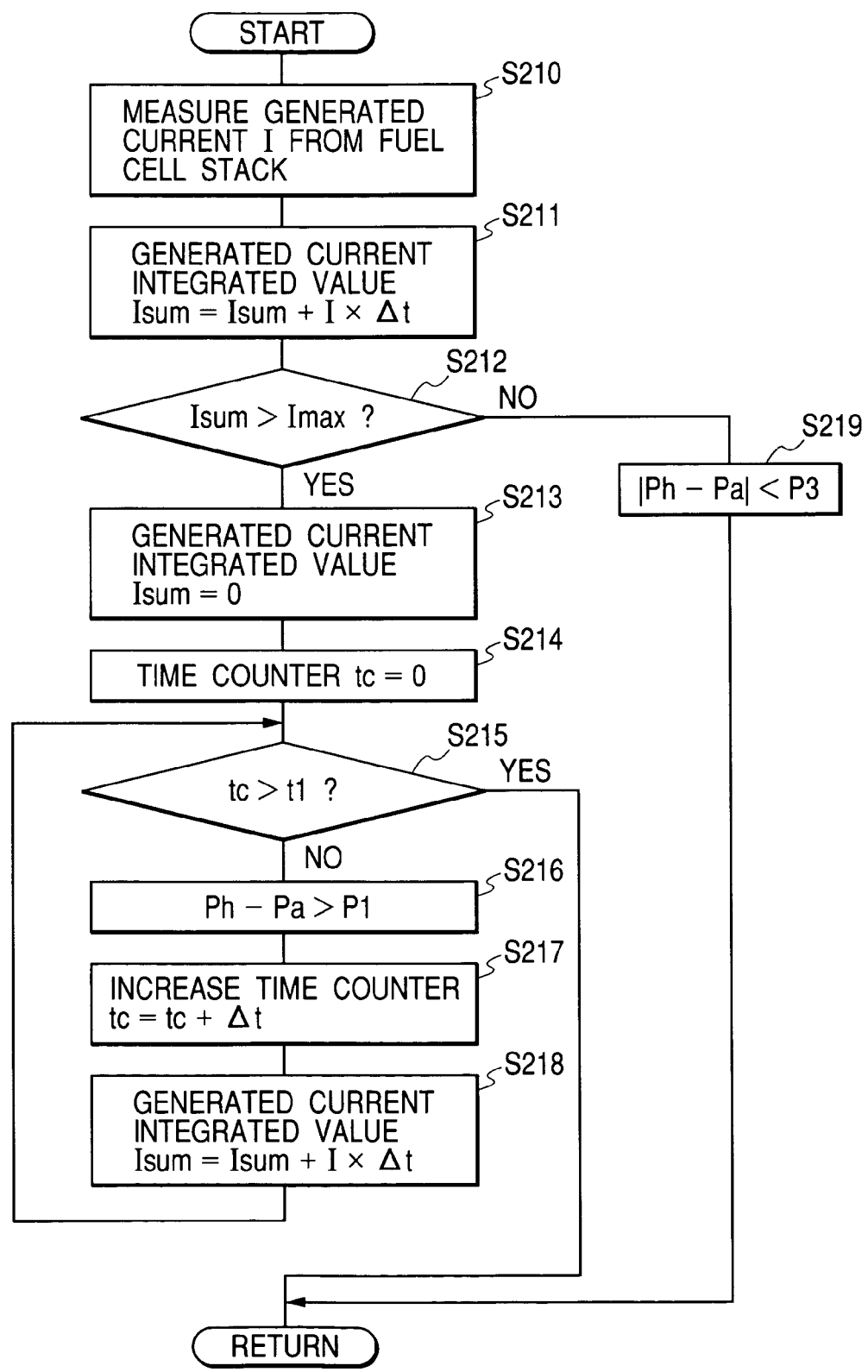
FIG. 6 is a flow chart showing control processing to be implemented in a fuel cell system according to a fourth embodiment of the present invention.

Referring to FIG. 6, a description will be given hereinbelow of a fourth embodiment of the present invention. This embodiment is made such that the water state of the fuel cell stack 10 is diagnosed on the basis of an integrated value of generated currents from the fuel cell stack 10. The entire configuration of the fuel cell system according to this embodiment is the same as that of the above-described second embodiment.

FIG. 6 is a flow chart showing control processing to be implemented in the control unit 40. A step S210 is first implemented to measure and read a generated current I from the fuel cell stack 10, then followed by a step S211 to update an integrated value Isum of the generated current I. Concretely, a value obtained by adding the product of the generated current I and a fixed time Δt to the generated current integrated value Isum immediately before is set as the generated current integrated value Isum.

Meanwhile, the quantity of water produced due to the generation of electricity is approximately in proportion to the generated current integrated value Isum. For this reason, in a step S212, a decision is made as to whether or not the generated current integrated value Isum exceeds a set integrated value Imax. If the generated current integrated value Isum exceeds the set integrated value Imax (step S212: YES), assuming that the water in the interior of the fuel cell stack 10 is in a superfluous condition, the pressure difference control in a step S216, which will be mentioned later, is executed only for a fixed period of time to eject the water on the fuel electrode side through the electrolyte membrane to the air electrode side.

That is, in a step S213, the generated current integrated value Isum is set at zero, and in a step S214, the time counter is reset so that the time tc becomes zero. Moreover, in a step S215, a decision is made as to whether the time tc exceeds a first set time t1. If the time tc does not exceed the first set time t1 after the implementation of a step S216, in a step S217, the time tc is updated to become a value obtained by adding a fixed time $\Delta t$ thereto, and in a step S218, the generated current integrated value Isum is updated to become a value obtained by adding the product of the generated current I and the fixed time $\Delta t$ to the generated current integrated value Isum immediately before. Subsequently, if the updated time tc exceeds the first set time t1 the decision of the step S215 indicates "YES", and the pressure difference control in the step S216 reaches completion.

In the step S216, the hydrogen pressure regulating valve 32 is controlled to increase the outlet portion hydrogen pressure Ph so that a pressure difference $\Delta P$ ($\Delta P=Ph-Pa$) between the outlet portion hydrogen pressure Ph and the inlet portion air pressure Pa exceeds a first set value P1 which is a positive value. Thus, when the outlet portion hydrogen pressure Ph is increased to be higher than the inlet portion air pressure Pa, it is possible to promote the effect of the water on the fuel electrode side being ejected through the electrolyte membrane to the air electrode side.

On the other hand, if the generated current integrated value Isum is below the set integrated value Imax (step S212: NO), assuming that the water in the interior of the fuel cell stack 10 is in an appropriate condition, the operational flow advances to a step S219.

In the step S219, the outlet portion hydrogen pressure Ph is controlled through the use of the hydrogen pressure regulating valve 32 so that the absolute value of the pressure difference between the outlet portion hydrogen pressure Ph and the inlet portion air pressure Pa falls below a third set value P3 which is a positive value. In this case, the third set value P3 is set to be lower than the first set value P1.

(Fifth Embodiment)

Figure 7:
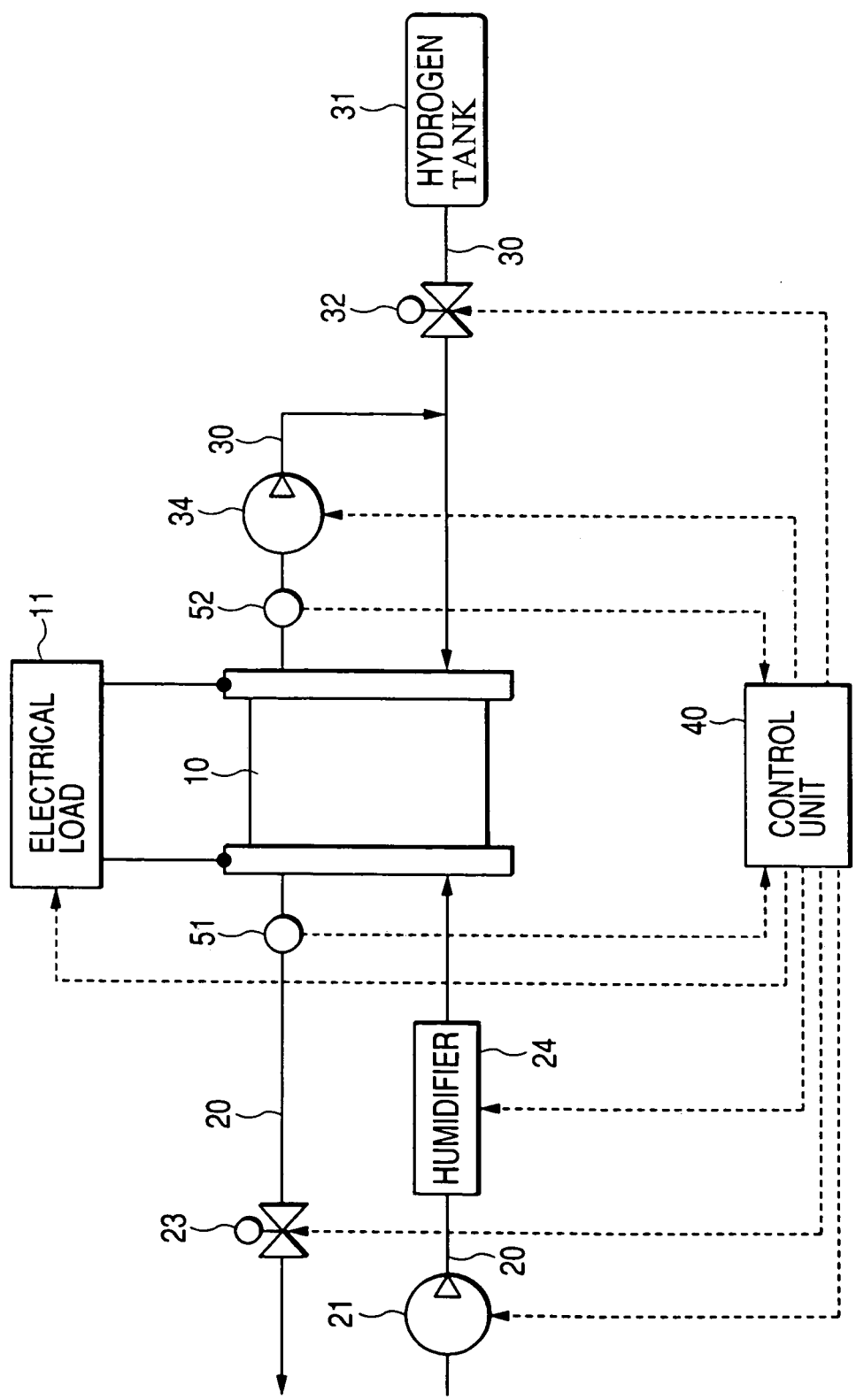
FIG. 7 is a schematic illustration of the entire configuration of a fuel cell system according to a fifth embodiment of the present invention.

Referring to FIG. 7, a description will be given hereinbelow of a fifth embodiment of the present invention. Unlike the above-described second embodiment in which the water state of the fuel cell stack 10 is diagnosed on the basis of an output voltage of each of the cells, the fifth embodiment is made such that the water state of the fuel cell stack 10 is diagnosed by measuring a water quantity of a gas. FIG. 7 is an illustration of the entire configuration of a fuel cell system according to this embodiment. Parts identical or corresponding to those of the second embodiment are marked with the same reference numerals, and the description thereof will be omitted for simplicity.

In FIG. 7, a first water quantity sensor 51 is placed in the air passage 20 on the downstream side of the fuel cell stack 10, i.e., on the air outlet side, to measure a water quantity of air passing through the fuel cell stack 10. Moreover, a second water quantity sensor 52 is placed in the fuel passage 30 on the downstream side of the fuel cell stack 10, i.e., on the hydrogen outlet side, to measure a water quantity of hydrogen passing through the fuel cell stack 10. The first water quantity sensor 51 and the second water quantity sensor 52 correspond to the water measuring means in the present invention.

Measurement signals from the first water quantity sensor 51 and the second water quantity sensor 52 are inputted to the control unit 40, and the control unit 40 diagnoses a water state of the fuel cell stack 10, more concretely, a water residence state or a dry state of the electrolyte membrane, on the basis of the signals from the first water quantity sensor 51 and the second water quantity sensor 52. Moreover, the control unit 40 carries out the control on the pressure difference between the outlet portion hydrogen pressure Ph and the inlet portion air pressure Pa and the control on the humidification quantity according to the diagnosis result.

Incidentally, although in this embodiment the first water quantity sensor 51 and the second water quantity sensor 52 are put to use, the employment of only one of these sensors 51 and 52 is also acceptable. Moreover, it is also possible that the first water quantity sensor 51 is placed in the air passage 20 on the upstream side of the fuel cell stack 10, that is, on the air inlet side. Still moreover, it is also possible that the second water quantity sensor 52 is placed in the fuel passage 30 on the upstream side of the fuel cell stack 10, that is, on the hydrogen inlet side.

(Sixth Embodiment)

Figure 8:
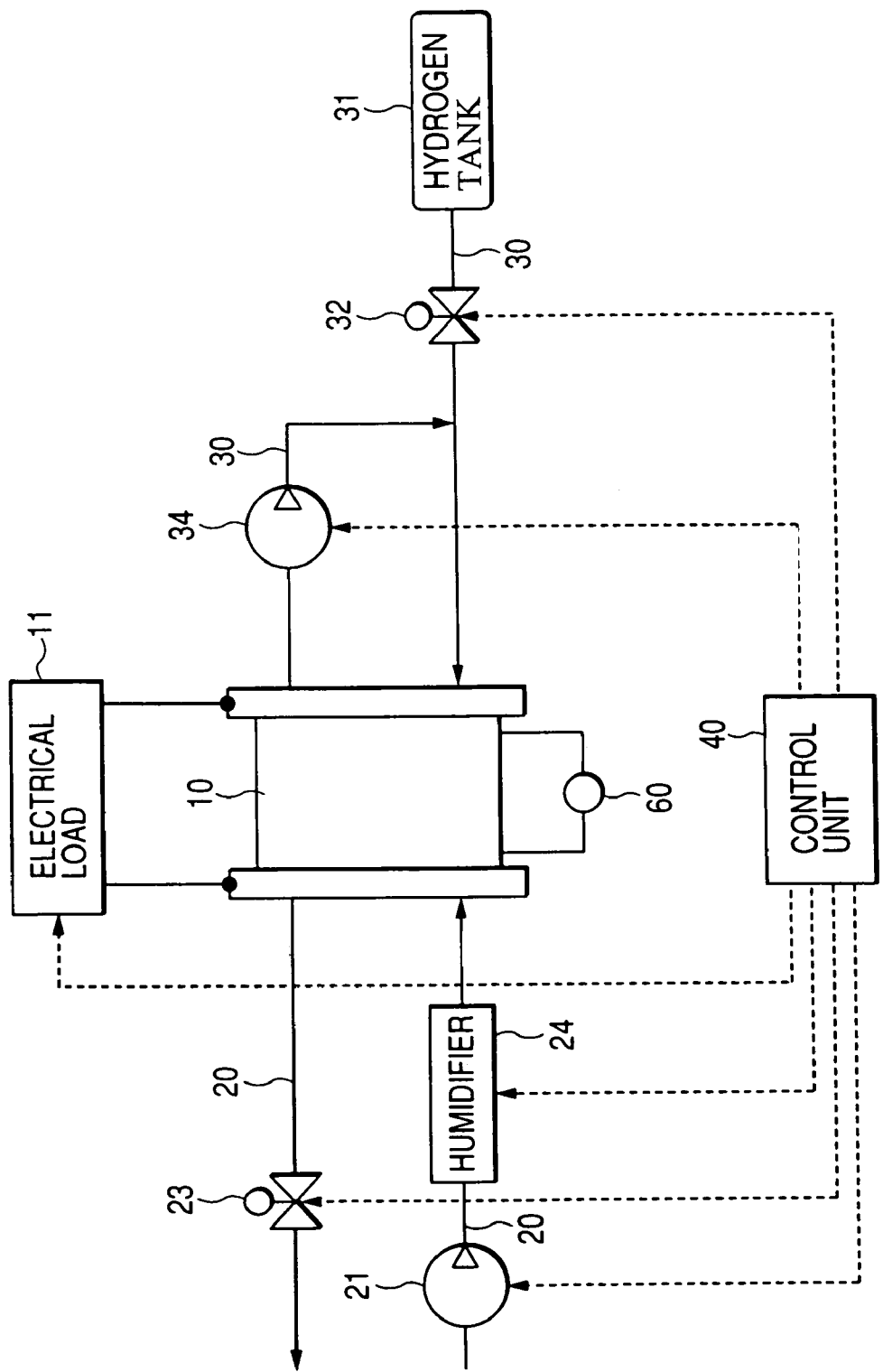
FIG. 8 is a schematic illustration of the entire configuration of a fuel cell system according to a sixth embodiment of the present invention.

Referring to FIG. 8, a description will be given hereinbelow of a sixth embodiment of the present invention. Although in the above-described second embodiment the water state of the fuel cell stack 10 is diagnosed on the basis of an output voltage of each of the cells, the sixth embodiment is made such that the water state of the fuel cell stack 10 is diagnosed by measuring a resistance of the electrolyte membrane of the fuel cell stack 10. FIG. 8 is an illustration of the entire configuration of a fuel cell system according to this embodiment. Parts identical or corresponding to those in the second embodiment are marked with the same reference numerals, and the description thereof will be omitted for brevity.

As FIG. 8 shows, the fuel cell system according to this embodiment is equipped with a resistance measuring device 60 made to measure a resistance of the electrolyte membrane of the fuel cell stack 10. This resistance measuring device 60 corresponds to the resistance measuring means in the present invention. A measurement signal from the resistance measuring device 60 is inputted to the control unit 40, and on the basis of the measurement signal from the resistance measuring device 60, the control unit 40 diagnoses a water state of the fuel cell stack 10, more concretely, a water residence state or a dry state of the electrolyte membrane. Moreover, the control unit 40 carries out the control on the pressure difference between the outlet portion hydrogen pressure Ph and the inlet portion air pressure Pa and the control on the humidification quantity according to the diagnosis result.

(Seventh Embodiment)

Figure 9:
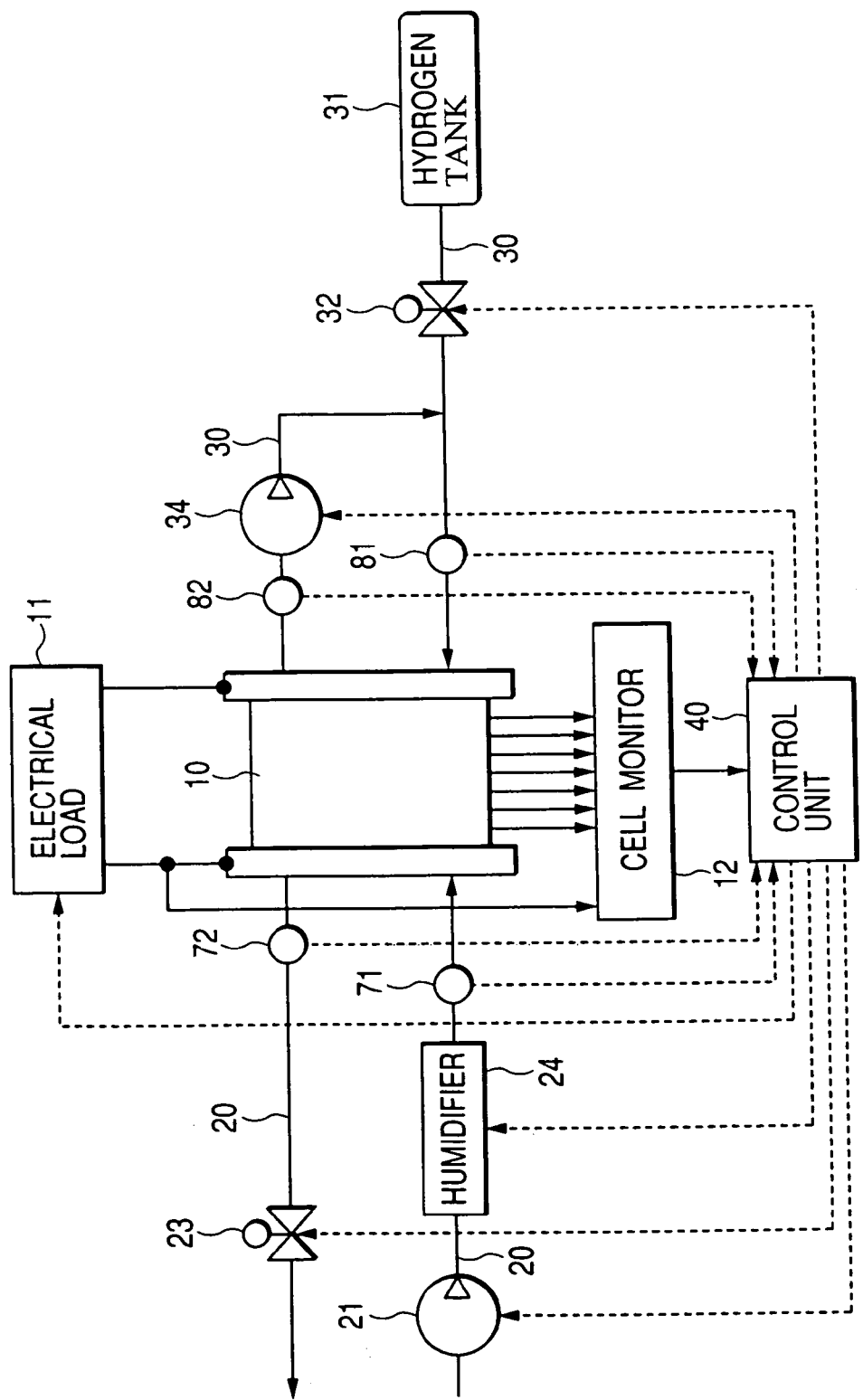
FIG. 9 is a schematic illustration of the entire configuration of a fuel cell system according to a seventh embodiment of the present invention.
Figure 10:
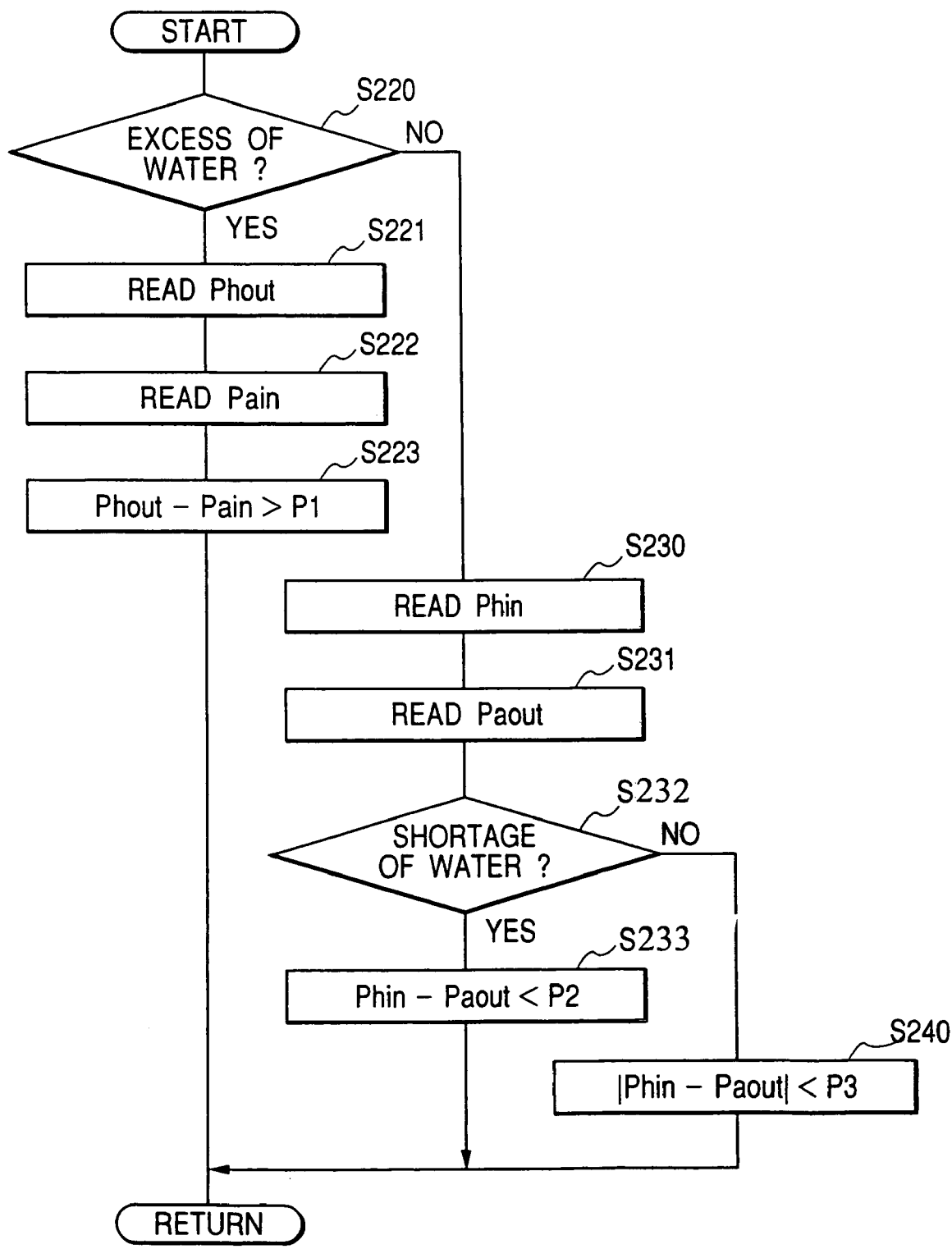
FIG. 10 is a flow chart showing control processing to be implemented in a control unit shown in FIG. 9.
Figure 4:
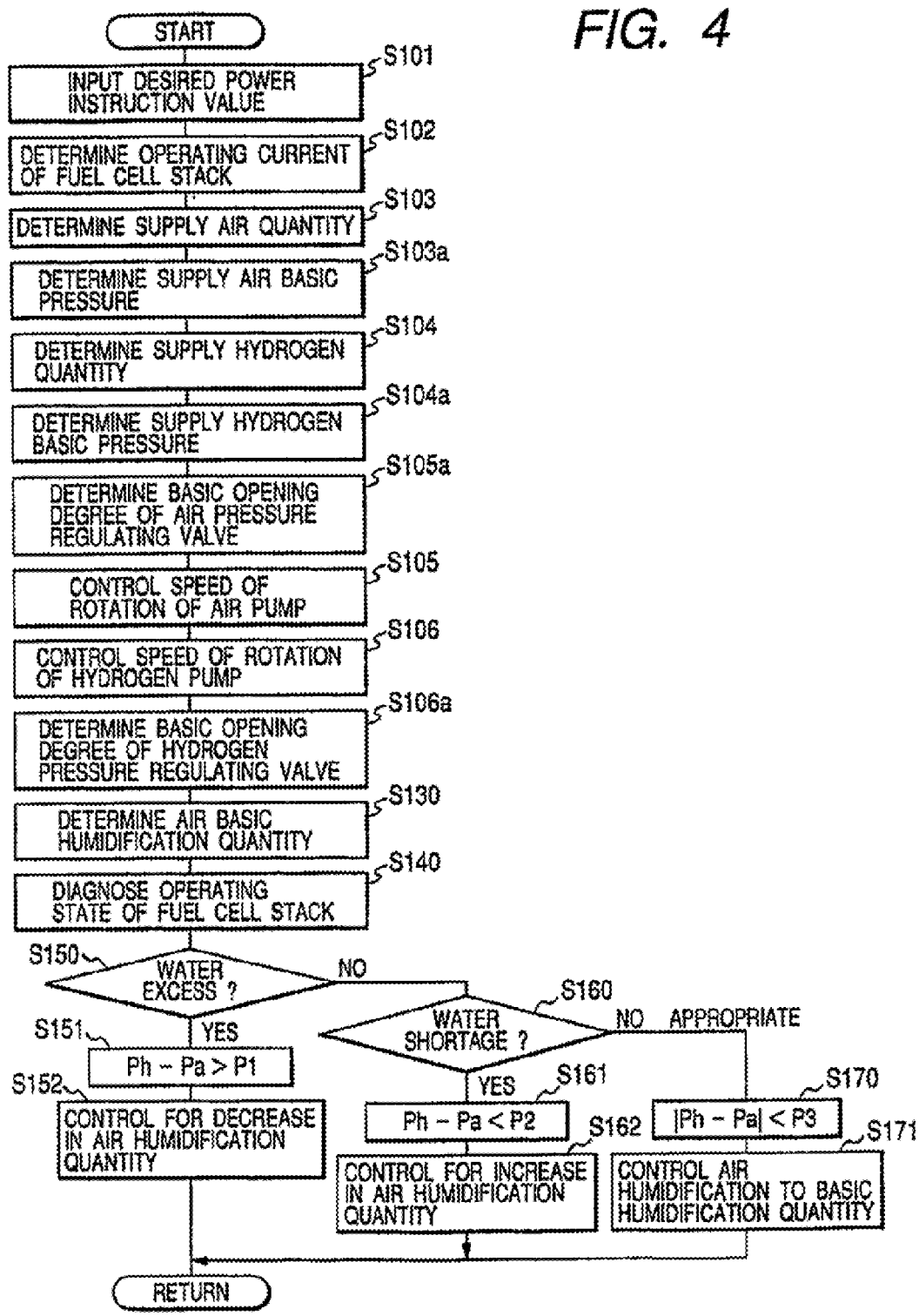
Figure 5:
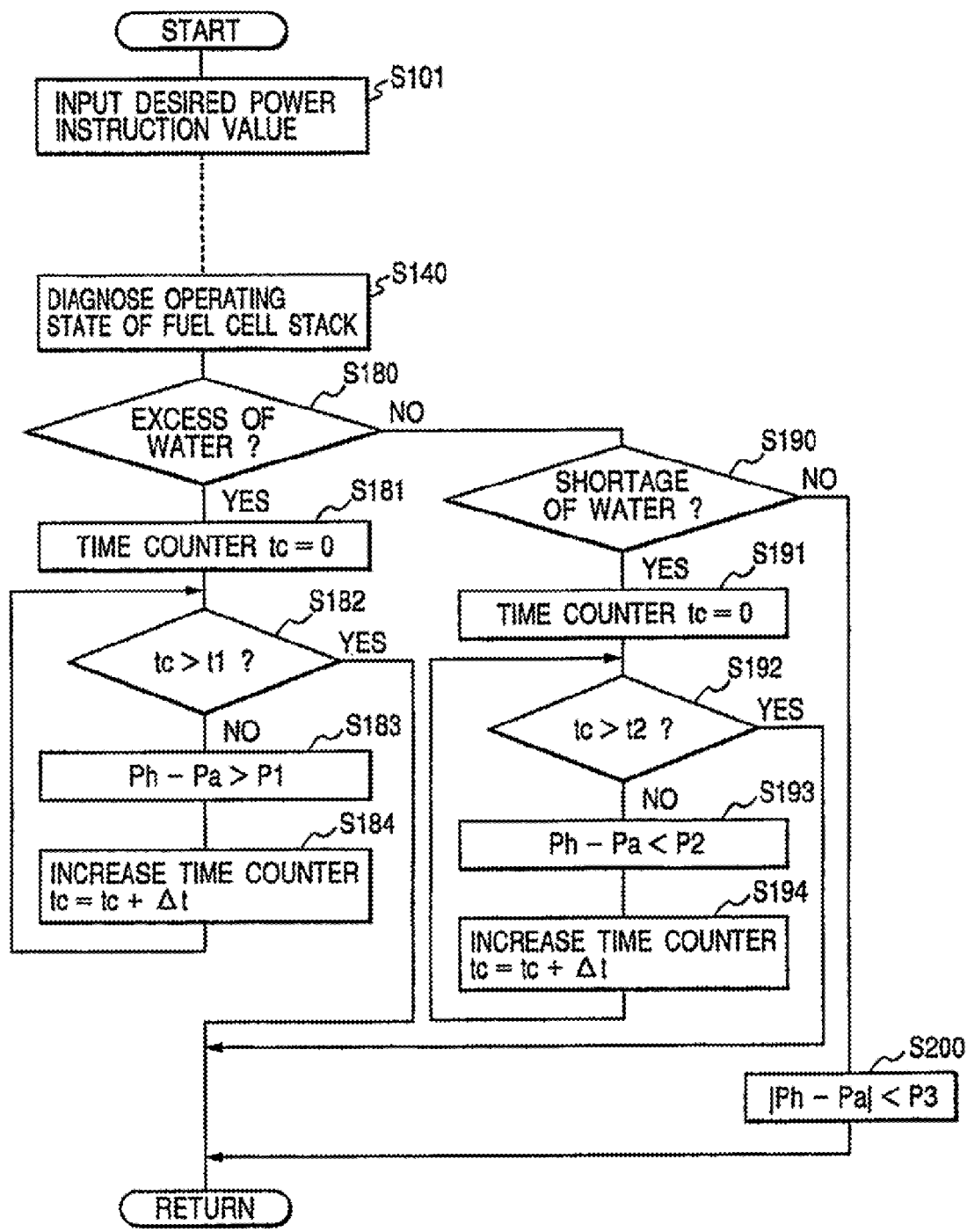

Referring to FIGS. 9 and 10, a description will be given hereinbelow of a seventh embodiment of the present invention. FIG. 9 is an illustration of the entire configuration of a fuel cell system according to this embodiment. Parts identical or corresponding to those in the second embodiment are marked with the same reference numerals and the description thereof will be omitted for brevity. FIG. 10 is a flow chart showing control processing to be implemented in the control unit 40.

In FIG. 9, a first air pressure sensor 71 is placed in the air passage 20 in the vicinity of the air inlet portion of the fuel cell stack 10 to measure an air pressure (which will be referred to hereinafter as an "inlet portion air pressure") Pain on the air inlet side in the interior of the fuel cell stack 10, while a second air pressure sensor 72 is placed in the air passage 20 in the vicinity of the air outlet portion of the fuel cell stack 10 to measure an air pressure (which will be referred to hereinafter as an "outlet portion air pressure") Paout on the air outlet side in the interior of the fuel cell stack 10. In this connection, Pain>Paout due to the ventilation resistance.

In addition, a first hydrogen pressure sensor 81 is located in the fuel passage 30 in the vicinity of the hydrogen inlet portion of the fuel cell stack 10 to measure a hydrogen pressure (which will be referred to hereinafter as an "inlet portion hydrogen pressure") Phin on the hydrogen inlet side in the interior of the fuel cell stack 10, while a second hydrogen pressure sensor 82 is located in the fuel passage 30 in the vicinity of the hydrogen outlet portion of the fuel cell stack 10 to measure a hydrogen pressure (which will be referred to hereinafter as an "outlet portion hydrogen pressure") Phout on the hydrogen outlet side in the interior of the fuel cell stack 10. In this connection, Phin>Phout due to the ventilation resistance.

The first air pressure sensor 71 corresponds to the oxidizer gas inlet pressure measuring means in the present invention, the second air pressure sensor 72 corresponds to the oxidizer gas outlet pressure measuring means therein, the first hydrogen pressure sensor 81 corresponds to the fuel gas inlet pressure measuring means therein, and the second hydrogen pressure sensor 82 corresponds to the fuel gas outlet pressure measuring means.

Secondly, referring to FIG. 10, a description will be given hereinbelow of an operation to be conducted in controlling the pressure difference between a hydrogen pressure and an air pressure in accordance with a result of diagnosis on an operating state of the fuel cell stack 10.

First of all, in a step S220, a decision is made, on the basis of an operating state diagnosis result (see the step S140 in FIG. 4) on the fuel cell stack 10, as to whether or not the water in the interior of the fuel cell stack 10 is in an excessive condition, more concretely, whether or not there exists a cell in which water resides on the fuel electrode side.

If it is considered that there is a cell in which water resides on the fuel electrode side, an outlet portion hydrogen pressure Phout is read in a step S221 and an inlet portion air pressure Pain is read in a step S222, then followed by a step S223 to implement the control whereby the outlet portion hydrogen pressure Phout is increased through the use of the hydrogen pressure regulating valve 32 so that a pressure difference $\Delta P$ ($\Delta P$=Phout−Pain) between the outlet portion hydrogen pressure Phout and the inlet portion air pressure Pain exceeds a first set value P1 which is a positive value.

Thus, the outlet portion hydrogen pressure Phout which assumes a minimum pressure in the hydrogen passage in the interior of the fuel cell stack 10 is controlled to become relatively higher with respect to the inlet portion air pressure Pain which takes a maximum pressure in the air passage in the interior of the fuel cell stack 10 and, hence, the hydrogen pressure becomes higher than the air pressure in the whole internal region of the fuel cell stack 10, which secures the effect of the water on the fuel electrode side being ejected through the electrolyte membrane to the air electrode side.

On the other hand, if the decision of the step S220 indicates "NO", the operational flow goes to a step S230 to read an inlet portion hydrogen pressure Phin, and further goes to a step S231 to read an outlet portion air pressure Paout, then followed by a step S232.

In the step S232, a decision is made, on the basis of an operating state diagnosis result (see the step S140 in FIG. 4) on the fuel cell stack 10, as to whether or not the water in the interior of the fuel cell stack 10 is in an insufficient condition, more concretely, whether or not the electrolyte membrane is in a dry condition. If it is considered that the electrolyte membrane is dried, the operational flow proceeds to a step S233.

In the step S233, through the control using the hydrogen pressure regulating valve 32, the inlet portion hydrogen pressure Phin is lowered so that the pressure difference between the inlet portion hydrogen pressure Phin and the outlet portion air pressure Paout falls below a second set value P2 which is a negative value.

Thus, the inlet portion hydrogen pressure Phin which assumes a maximum pressure in the hydrogen passage in the interior of the fuel cell stack 10 is controlled to become relatively lower with respect to the outlet portion air pressure Paout which takes a minimum pressure in the air passage in the interior of the fuel cell stack 10 and, hence, the hydrogen pressure becomes lower than the air pressure in the whole internal region of the fuel cell stack 10, which secures the effect of the water being moved from the air electrode side through the electrolyte membrane to the fuel electrode side.

On the other hand, in a case in which the water in the interior of the fuel cell stack 10 has an appropriate value, more concretely, if water does not stay on the fuel electrode side and the electrolyte membrane is in a non-dried condition, the decisions of the steps S220 and S232 show "NO" and the operational flow proceeds to a step S240.

In the step S240, through the use of the hydrogen pressure regulating valve 32, the inlet portion hydrogen pressure Phin is controlled so that the pressure difference between the inlet portion hydrogen pressure Phin and the outlet portion air pressure Paout is decreased, more concretely, the absolute value of the pressure difference between the inlet portion hydrogen pressure Phin and the outlet portion air pressure Paout falls below a third set value P3 which is a positive value. The implementation of this control enables the water in the interior of the fuel cell stack 10 to be maintained in an appropriate state. In this case, the third set value P3 is set to be lower than the first set value P1 and to be lower than the absolute value of the second set value P2.

(Other Embodiment)

Although in the above-described embodiments the pressure regulating valves 23 and 32 are respectively provided in the air passage 20 and the fuel passage 30, it is also appropriate that, for example, a pressure regulating valve is provided in only one of the passages and the pipe diameter of the other passage is fixed so that the opening degree of the pressure regulating valve provided in the one passage is adjusted to control the pressure difference between the oxidizer gas pressure and the fuel gas pressure.

It should be understood that the present invention is not limited to the above-described embodiments, and that it is intended to cover all changes and modifications of the embodiments of the invention herein which do not constitute departures from the spirit and scope of the invention.

What is claimed is:

1. A fuel cell system comprising:
   a fuel cell stack which generates electric energy through an electrochemical reaction between an oxidizer gas containing oxygen as its principal component and a fuel gas containing hydrogen as its principal component;
   at least one of first pressure adjusting means for adjusting a pressure of said oxidizer gas to be supplied to said fuel cell stack and second pressure adjusting means for adjusting a pressure of said fuel gas to be supplied to said fuel cell stack; and
   water state diagnosing means for diagnosing a water state of said fuel cell stack,
   with a difference between the pressure of said oxidizer gas and the pressure of said fuel gas being controlled in accordance with a result of the diagnosis in said water state diagnosing means.

2. The system according to claim 1, wherein, when an internal water in said fuel cell stack is diagnosed as being in an excessive state, the pressure difference between said fuel gas and said oxidizer gas is controlled so that the pressure of said fuel gas becomes higher than the pressure of said oxidizer gas.

3. The system according to claim 1, wherein, when an internal water of said fuel cell stack is diagnosed as being in shortage, the pressure difference between said oxidizer gas and said fuel gas is controlled so that the pressure of said fuel gas becomes lower than the pressure of the oxidizer gas.

4. The system according to claim 1, wherein, if an internal water of said fuel cell stack is diagnosed as in an appropriate amount, the pressure difference between said fuel gas and said oxidizer gas is decreased.

5. The system according to claim 1, further comprising water quantity adjusting means for controlling a water content of at least one of said oxidizer gas and said fuel gas so that the water content of at least one of said oxidizer gas and said fuel gas is decreased when a water permeation to said fuel gas is diagnosed as excessive.

6. The system according to claim 1, further comprising water quantity adjusting means for controlling a water content of at least one of said oxidizer gas and said fuel gas so that the water content of at least of said oxidizer gas and said fuel gas is increased when the interior of said fuel cell stack is diagnosed as a dry state.

7. The system according to claim 1, wherein the pressure difference between said oxidizer gas and said fuel gas is controlled only for a fixed length of time in accordance with a result of the diagnosis.

8. The system according to claim 1, wherein, when an integrated value of currents generated from said fuel cell stack exceeds a predetermined value, said water state diagnosing means makes a diagnosis that water in said fuel cell stack is in an excessive state.

9. The system according to claim 1, wherein said fuel cell stack includes a plurality of cells and said water state diagnosing means makes a diagnosis on a water state of said fuel cell stack on the basis of a dispersion state of generated voltages among said cells.

10. The system according to claim 1, wherein said water state diagnosing means includes water quantity measuring means provided in at least one of an oxidizer gas outlet/inlet portion of said fuel cell stack and a fuel gas outlet/inlet port thereof for measuring a water quantity of the gas.

11. The system according to claim 1, wherein said water state diagnosing means includes resistance measuring means for measuring a resistance of an electrolyte membrane of said fuel cell stack.

12. The system according to claim 1, further comprising oxidizer gas inlet pressure measuring means for measuring an inlet pressure of said oxidizer gas in the interior of said fuel cell stack and fuel gas outlet pressure measuring means for measuring an outlet pressure of said fuel gas in the interior of said fuel cell stack, with the pressure of said oxidizer gas and the pressure of said fuel gas being controlled in accordance with results of the measurement by said oxidizer gas inlet pressure measuring means and said fuel gas outlet pressure measuring means.

13. The system according to claim 1, further comprising oxidizer gas inlet pressure measuring means for measuring an inlet pressure of said oxidizer gas in the interior of said fuel cell stack, oxidizer gas outlet pressure measuring means for measuring an outlet pressure of said oxidizer gas in the interior of said fuel cell stack, fuel gas inlet pressure measuring means for measuring an inlet pressure of said fuel gas in the interior of said fuel cell stack, and fuel gas outlet pressure measuring means for measuring an outlet pressure of said fuel gas in the interior of said fuel cell stack, with the pressure of said oxidizer gas and the pressure of said fuel gas being controlled on the basis of the outlet pressure of one of said oxidizer gas and said fuel gas which is controlled to be higher than the other and the inlet pressure of one of said oxidizer gas and said fuel gas which is controlled to be lower than the other.

* * * * *

UNITED STATES PATENT AND TRADEMARK OFFICE
CERTIFICATE OF CORRECTION

PATENT NO.        : 7,122,263 B2
APPLICATION NO.   : 10/628533
DATED             : October 17, 2006
INVENTOR(S)       : Tomonori Imamura and Akimasa Osaki It is certified that error appears in the above-identified patent and that said Letters Patent is hereby corrected as shown below:

The sheets of drawings consisting of figures 4 and 5 should be deleted to appear as per attached figures 4 and 5.

Signed and Sealed this

Sixth Day of November, 2007

JON W. DUDAS
*Director of the United States Patent and Trademark Office*